United States Patent
Berger et al.

[11] Patent Number: 5,559,815
[45] Date of Patent: Sep. 24, 1996

[54] PULSED LASER

[75] Inventors: Vadim Berger, Bad Sooden-Allendorf; Jürgen Kleinschmidt, Weissenfels; Uwe Stamm, Göttingen; Wolfgang Zschoke, Altena/Westf. all of Germany

[73] Assignee: Lambda Physik Gesellschaft Zur Herstellung Von Lasern mbH, Germany

[21] Appl. No.: 438,168

[22] Filed: May 9, 1995

[30] Foreign Application Priority Data

May 31, 1994 [DE] Germany ............ 44 19 069.7

[51] Int. Cl.$^6$ ...................................... H01S 3/10
[52] U.S. Cl. ............. 372/25; 372/102; 372/69; 372/32; 372/93; 372/98
[58] Field of Search ................... 372/25, 30, 31, 372/32, 29, 20, 102, 69, 93, 98

[56] References Cited

U.S. PATENT DOCUMENTS

| | | | |
|---|---|---|---|
| 4,399,540 | 8/1983 | Bücher | 372/20 |
| 5,121,398 | 6/1992 | Rao | 372/20 |
| 5,128,601 | 7/1992 | Orbach et al. | 372/30 |
| 5,136,596 | 8/1992 | Rao et al. | 372/20 |
| 5,157,676 | 10/1992 | Wilcox | 372/30 |
| 5,260,954 | 11/1993 | Dane et al. | 372/30 |
| 5,285,059 | 2/1994 | Nakata et al. | 372/29 |
| 5,315,604 | 5/1994 | Chiu et al. | 372/25 |
| 5,406,571 | 4/1995 | Bücher et al. | 372/20 |

FOREIGN PATENT DOCUMENTS

| | | | |
|---|---|---|---|
| 2918863 | 5/1979 | Germany | H01S 3/02 |
| 4302378 | 1/1993 | Germany | H01S 3/105 |

*Primary Examiner*—Leon Scott, Jr.
*Attorney, Agent, or Firm*—Limbach & Limbach L.L.P.

[57] ABSTRACT

A pulsed laser comprises an oscillator (10), a laser medium (14), a wavelength selective member (12) for tuning the wavelength of a beam pulse (18) emitted by the oscillator, and means for pulsed excitation of the laser medium (14). The laser medium (14) is excited at least twice at consecutive times to generate a single beam pulse (18).

9 Claims, 3 Drawing Sheets

PULSED LASER

FIELD OF THE INVENTION

The instant invention relates to a pulsed laser, comprising an oscillator, a laser medium, a wavelength selective member for tuning the wavelength of a beam pulse emitted by the oscillator, and means for pulsed excitation of the laser medium.

BACKGROUND OF THE INVENTION

A laser oscillator of the kind mentioned comprises a laser medium of which the emission band is so broad that the laser oscillator is tunable by means of a wavelength selective member.

The fundamental structure of tunable laser oscillators is known, for instance, from DE 29 18 863 C2. Such laser oscillators comprise a broadband emitting laser medium, for example a dye solution, excimers obtained by gas discharge, or solid state materials. For wavelength tuning, a dispersing member is arranged inside the resonator of such a laser oscillator. This tuning member (wavelength selective member), for example, may be a grating or a dispersing prismatic arrangement. Other wavelength selective means may be used as well, such as an etalon, a Fabry-Pérot interferometer, or double refractive crystals.

In the case of the arrangement disclosed in DE 29 18 863 C2, the laser radiation uncoupled contains both narrowband radiation whose spectral distribution is determined substantially by the beam expanding device and the wavelength selective member and relatively broadband radiation whose spectral distribution is given essentially by the broadband emitting laser medium. This broadband spontaneous radiation is referred to as ASE (amplified spontaneous emission). The ratio between the energy of the narrowband laser radiation and the energy of the ASE is called spectral purity of the radiation issuing from the laser oscillator. This spectral purity of the laser output radiation deteriorates, for example, if the laser medium is excited in pulsed fashion and the duration of the excitation pulses lies in the same order of magnitude as the transit time of the light inside the laser resonator (oscillator). Typically, such transit time is some 2 to 3 nanoseconds, depending on the type of laser.

The spectral purity of laser radiation also deteriorates, for instance, if the output radiation is intensified still further as soon as the ASE and the spectrally pure laser light (i.e. the radiation having the relatively narrow bandwidth) take different courses in time inside the laser. In general, ASE occurs prior to laser radiation.

DE 29 18 863 C2, already mentioned above, also teaches to connect a means for spectral filtering downstream of the laser resonator to suppress the ASE and improve the spectral purity of the output radiation.

German patent application P 43 02 378 discloses a laser oscillator of the generic type in question with which the spectral purity of the pulsed output beam is improved in that the beam emitted by the laser oscillator is coupled out from the resonator by means of an optical element after having passed through an expansion means and the wavelength selective member and before again passing through the laser medium where once more broadband radiation (spontaneous fluorescence and ASE) is mixed to it. Expensive optical means are needed for this earlier proposal, particularly expander means and complicated optics for coupling out the beam.

SUMMARY OF THE INVENTION

It is an object of the invention to improve a tunable pulsed laser of the kind specified initially such that great spectral purity of the output radiation will be achieved at little structural expenditure.

The solution of that problem, in accordance with the invention, is characterized in claim 1. Accordingly, the invention provides that, in order to generate a single emitted beam pulse, the laser medium be excited at least twice, at consecutive times, so as to emit radiation.

It is known with pulsed gas discharge lasers to excite the laser medium (gas mixture) twice at consecutive times to generate a single emitted laser beam pulse, once being for so-called pre-ionization and the second time for creating a so-called primary gas discharge. Such twofold excitation of the laser medium is not what the invention is concerned with. Moreover, this known pre-ionization is not an excitation of the laser gas in the true sense of laser technique. Excitation, in laser technique, means that the laser medium is excited at least to such a degree that it will emit radiation of a wavelength which corresponds to that of the radiation which the laser is intended to produce. What happens with pre-ionization, on the other hand, is that free electrons are generated in the gas which subsequently is subjected to gas discharge, the purpose being to obtain the best possible homogeneous primary gas discharge.

A great variety of laser systems are known to those skilled in the art, including pulsed gas discharge lasers, dyestuff lasers, solid state lasers, etc. The invention is applicable, in principle, to a great number of known types of lasers.

According to a preferred embodiment of the laser of the invention the excitation means comprises a radiation source, and at least two radiation pulses are directed successively into the laser medium. In such a laser system, therefore, the laser medium of the oscillator is pumped by an additional separate radiation source. As widely known in the art of lasers, this additional radiation source may be another laser. For example, dye lasers often are pumped by excimer lasers. The present invention is especially well suited for the system mentioned last.

According to another preferred modification of the invention the two consecutive radiation pulses are obtained from a single pumping radiation pulse, especially so by having the first radiation pulse run through a shorter path than the second radiation pulse.

To obtain maximum spectral purity of the emitted laser beam, it is provided according to another preferred modification of the invention that the time interval between the two radiation pulses corresponds at least approximately to the transit time of the radiation in the oscillator. This interval in time between the two excitation radiation pulses depends on the structure and geometric design of the laser system used and must be optimized separately for each system, for instance, experimentally.

Furthermore, in accordance with a preferred modification of the invention, the mutual relationship of the intensities of the excitation radiation pulses is optimized so that the energy of the broadband spontaneous radiation (ASE) will reach minimum values.

BRIEF DESCRIPTION OF THE DRAWING

The invention will be described further, by way of example, with reference to the accompanying drawings, in which.

DESCRIPTION OF THE PREFERRED EMBODIMENT

Figure 1:
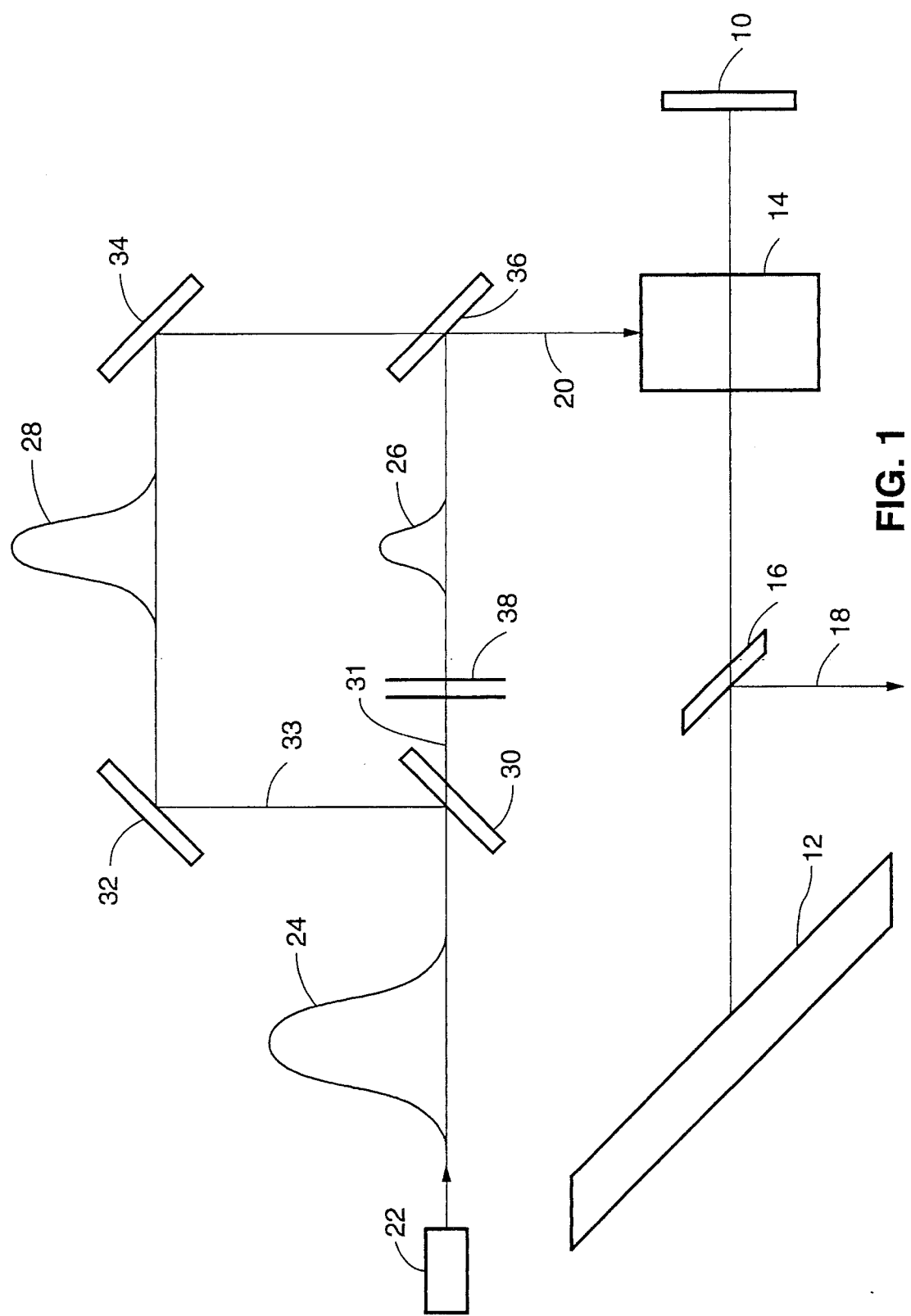
FIG. 1 is a diagrammatic presentation of a pulsed tunable laser comprising an oscillator and an excitation system.

FIG. 1 diagrammatically shows a laser system comprising an oscillator which is formed by a front mirror 10 and a rear mirror 12. Here the rear mirror 12 at the same time is a wavelength selective member in the form of a reflective grating. In the oscillator, a laser medium 14 is arranged in the beam path between the mirror 10 and the grating 12. The laser medium 14, for example, may be a cuvette filled with dye where the invention is realized with a dye laser pumped by another laser, as will be described below.

The resonator houses a coupling-out mirror 16 which is partially transmissive to the oscillating radiation in the oscillator (also referred to as "resonator") so that an output radiation pulse 18 will be emitted. This output radiation pulse 18 is the emitted laser pulse which is to be generated.

The laser medium 14 is excited by radiation pulses 20, in other words a so-called population inversion is caused in the laser medium 14.

In the embodiment shown, the radiation source for exciting the laser medium 14 is another laser 22, in this case a quality modulated solid state laser (e.g. an Nd:YAG laser) the radiation of which may be transformed by frequency multiplication, for example, into the visible or ultraviolet spectral ranges, and which generates a pumping radiation pulse 24.

The pumping laser may be an excimer laser or a nitrogen laser; other pulsed lasers having output radiation in the visible or ultraviolet ranges my be used as well.

The pumping radiation pulse 24 impinges upon a first partially transmissive mirror 30 whereby the radiation is split into a first part beam 31 passing straight through and a deflected second part beam 33 which impinges on a totally reflective mirror 32. In this manner two radiation pulses 26, 28 are created which are indicated symbolically in FIG. 2. Having passed an attenuator 38, the first radiation pulse 26 hits a mirror 36, thereupon the first radiation pulse 26 reaches the laser medium 14, as indicated by arrow 20.

The second radiation pulse 28 is deflected by a totally reflecting mirror 34 and likewise reaches the laser medium 14, as indicated by arrow 20, yet at a later point in time. This delay in time results from the additional distance which the second radiation pulse 28 must cover before both pulses reach the laser medium 14 successively. In the embodiment shown in FIG. 1 this longer path of the second radiation pulse 28 is the running distance from the partially transmissive mirror 30 to the totally reflective mirror 32 plus the running distance from the totally reflective mirror 34 to the partially transmissive mirror 36. This total distance divided by the velocity of light yields the interval in time between the two radiation pulses 26, 28 arriving at the laser medium 14.

Figure 2:
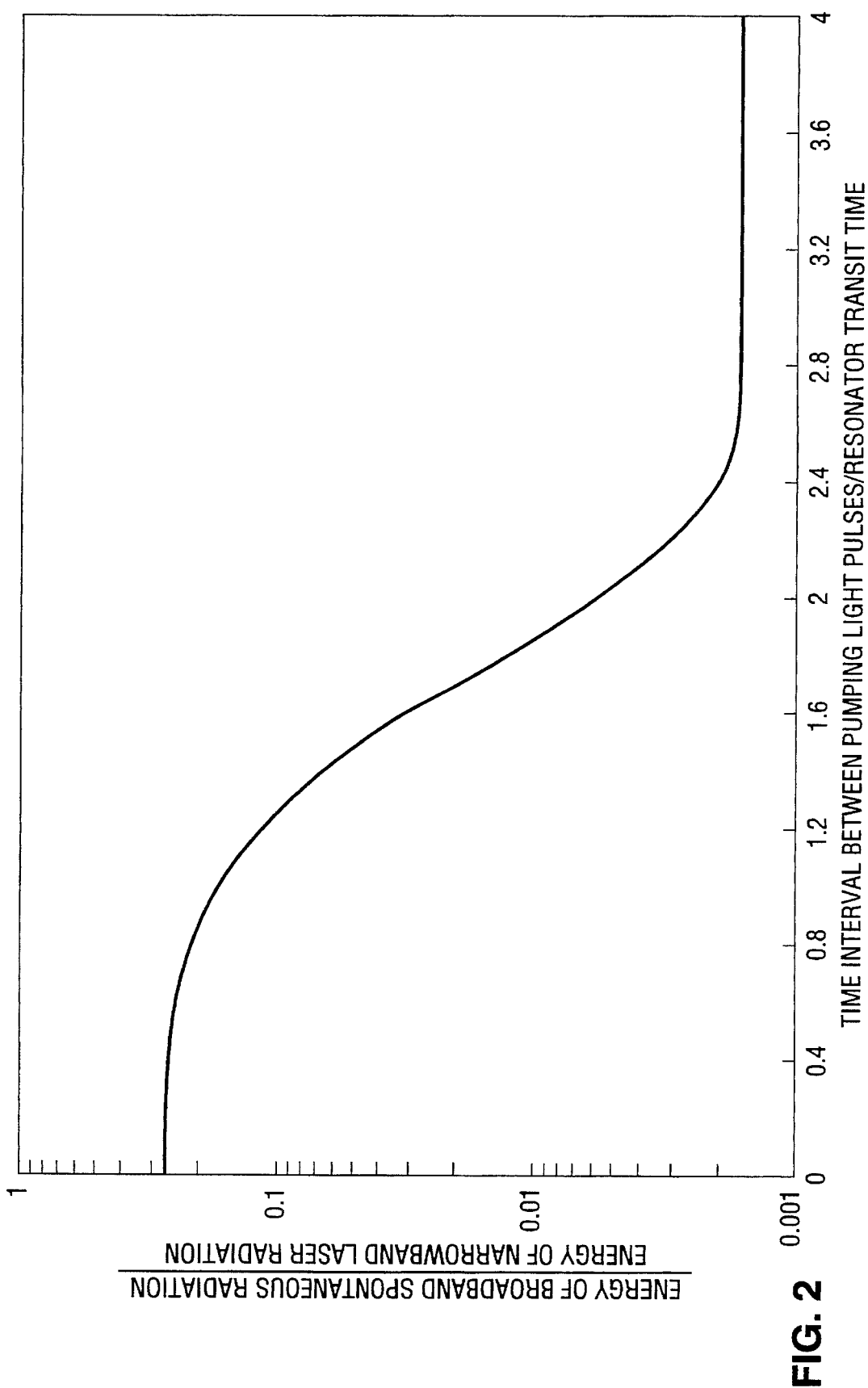
FIG. 2 illustrates the dependence of the inverse value of the spectral purity of the laser output radiation on the ratio between the time interval of the two excitation radiation pulses and the transit time of the radiation in the resonator.

The optical delay path which is established by the spacing of mirrors 30/32 and 34/36 and which determines the spacing in time of the radiation pulses 26, 28 as they reach the laser medium 14 is adjusted in such a way that the time interval between the two radiation pulses 26, 28 upon impinging on the laser medium 14 results as one where the ratio between the energy of the broadband spontaneous radiation and the energy of the narrowband laser radiation (i.e. the inverse value of the "spectral purity") reaches minimum level, as shown in FIG. 2.

According to a qualitative explanation of the physical effect observed of great improvement of the spectral purity of the radiation due to laser excitation by means of the arrangement illustrated in FIG. 1, a relatively weaker first radiation pulse 26 accomplishes a first excitation of the laser medium 14. Part of the photons emitted spontaneously and in stimulated fashion travel to the wavelength selective grating 12 and then return to the laser medium 14. The wavelength selective grating 12 has the effect of imparting to the reflected radiation a greater spectral purity than the original radiation had which was incident upon the grating 12, coming from the laser medium 14. The radiation reflected by the grating arrives at the laser medium 14 approximately at the time (or slightly before the time) that the relatively stronger second radiation pulse 28 excites the laser medium 14. The radiation of higher spectral purity already present in the laser resonator, on the whole, causes laser output radiation 18 which contains a much lower proportion of spectral broadband background radiation (ASE) as compared to the known single pulse excitation of the laser medium. The situation depicted above is merely of qualitative nature. As illustrated in FIG. 2, more precise quantitative calculations prove that further improvement in the spectral purity (i.e. of the contrast of the actual laser energy as compared to the ASE) is achieved at a greater delay in time between the two radiation pulses 26, 28. FIG. 2 also demonstrates that considerable improvement of the spectral purity commences already when the interval in time between the two radiation pulses 26, 28 is approximately 1.5 times the period of time which the radiation needs to traverse the resonator once. The optimum value of spectral purity is reached approximately when the interval in time between the two radiation pulses 26, 28 corresponds to 2.6 times the resonator transit time, or more. Good results are achieved when the time interval between the two radiation pulses 26, 28, as they reach the laser medium 14, lies in the same order of magnitude as the resonator transit time, in other words when it is from about two to ten times the resonator transit time.

Figure 3:
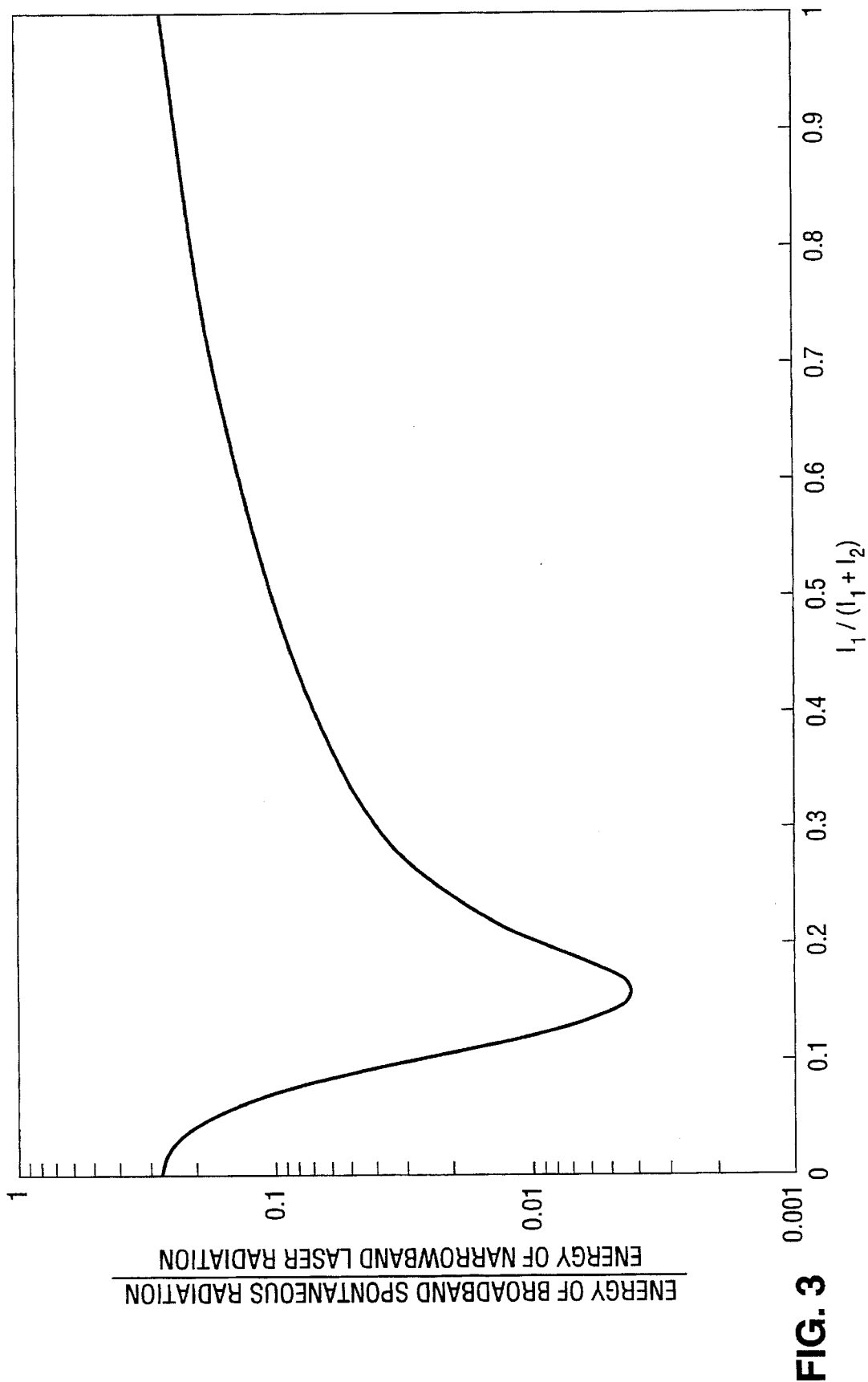
FIG. 3 illustrates the dependence of the inverse value of the spectral purity of the emitted output radiation on the ratio between the intensity of the first excitation radiation pulse and the sum of the intensities of both excitation radiation pulses.

FIG. 3 illustrates the ratio of the inverse value of spectral purity in dependence on the ratio of the intensities of the pumping radiation pulses 26, 28. In FIG. 3 the inverse value of the spectral purity is plotted logarithmically on the ordinate, while the abscissa reflects the ratio between the intensity $I_1$ of the first radiation pulse 26 and the sum of the intensities of the first and second radiation pulses 26 and 28. It follows from the results shown in the graph of FIG. 3 that the best values in terms of spectral purity are obtained when the intensity $I_1$ of the first radiation pulse 26 lies between 10% and 25% of the total intensity of both radiation pulses 26, 28. The optimum, in the case of the embodiment shown, is achieved approximately at 15%.

What is claimed is:

1. A pulsed oscillator comprising:

a resonant cavity;

a gain medium located within the cavity;

a wavelength selective member for narrowing the wavelengths of light emitted from the cavity; and means for exciting said gain medium to generate output pulses of laser light, said excitation means generating at least one seed excitation pulse followed by a primary excitation pulse and wherein the time interval between the seed pulse and the primary pulse is sufficient to allow light generated by the gain medium in response to the seed pulse to reach the wavelength selective member and return to said gain medium whereby the light generated in response to the subsequent primary pulse will have an enhanced spectral purity.

2. An oscillator as recited in claim 1 wherein the intensity of the seed excitation pulse is less than the intensity of the primary excitation pulse.

3. An oscillator as recited in claim 1 wherein the intensity of the seed excitation pulse is between 10 and 25 percent of the intensity of the primary excitation pulse.

4. An oscillator as recited in claim 1 wherein the time interval between the seed excitation pulse and the primary excitation pulse is at least 1.5 times the period for light to traverse the cavity.

5. An oscillator as recited in claim 1 wherein the time interval between the seed excitation pulse and the primary excitation pulse is between two and ten times the period for light to traverse the cavity.

6. An oscillator as recited in claim 1 wherein said wavelength selective member forms a part of said resonant cavity.

7. An oscillator as recited in claim 1 wherein said wavelength selective member is a grating.

8. An oscillator as recited in claim 1 wherein said means for exciting said gain medium is defined by an optical pump source for generating output pulses, and wherein each output pump pulse is divided into a pair of pulses, with the first pulse in the pair defining the seed excitation pulse and the second pulse of the pair defining the primary excitation pulse.

9. An oscillator as recited in claim 8 wherein said excitation means further includes a partially transmissive mirror for dividing said output pump pulses into a pair of pulses, said pair of pulses travelling along two different paths to said gain medium, with difference in the length of the two paths defining the time interval between the arrival of the seed and primary pulses at the gain medium.

* * * * *